United States Patent Office 3,476,800
Patented Nov. 4, 1969

3,476,800
OIL-SOLUBLE SULFONIC ACIDS AND PROCESS FOR MANUFACTURE THEREOF
Vincent J. Cease, Chester, Pa., assignor to Continental Oil Company, Ponca City, Okla., a corporation of Delaware
No Drawing. Filed Mar. 15, 1965, Ser. No. 440,001
Int. Cl. C07c *143/38*
U.S. Cl. 260—505       7 Claims

ABSTRACT OF THE DISCLOSURE

Oil-soluble sulfonic acid composition containing at least 82 percent, and preferably at least 90 percent, oil-soluble sulfonic acid, said composition being fluid at ambient temperatures, and having a sulfuric acid content of less than 0.8 percent.

Process for preparing the above-described composition wherein an important aspect of the process is removal of sulfuric acid from a volatile hydrocarbon solution containing oil-soluble sulfonic acids prior to distillation of the volatile hydrocarbon solution to obtain the desired composition.

---

The present invention relates to improved oil-soluble sulfonic acids and to a process for the manufacture thereof. More particularly, the present invention relates to concentrated oil-soluble sulfonic acids having improved properties and to a process for the manufacture of said sulfonic acids.

Oil-soluble sulfonic acids are particularly useful materials of present day commerce, in that the metal salts thereof, and particularly the barium and calcium salts, are used in preparing detergents for use as additives in lubricating oils. Historically, the first oil-soluble sulfonic acids were the mahogany sulfonic acids, which are a by-product of the treatment of lubricating oil distillates with fuming sulfuric acid in the manufacture of medicinal and technical white oils. Mahogany sulfonic acids are available commercially only as the sodium salt, since the dilute acids are first neutralized with sodium carbonate or sodium hydroxide. The resulting sodium sulfonates are extracted from the oil with an alcohol solvent.

Use of a sulfonic acid, rather than a sodium sulfonate, is preferable in preparing barium or calcium sulfonates. In order to prepare barium or calcium sulfonate from a sodium sulfonate it is necessary to either acidify and then purify the acid or use a double decomposition reaction. The latter results in sodium chloride being formed as a harmful by-product.

More recently, synthetic sulfonic acids and sulfonates have been the major oil-soluble sulfonic acids and sulfonates of commerce. The synthetic sulfonic acids are prepared by sulfonating various synthetic alkylated aromatic hydrocarbons. A particularly good example of a synthetic oil-soluble sulfonic acid is the material obtained by sulfonating postdodecylbenzene. Postdodecylbenzene is the bottoms product resulting from the manufacture of dodecylbenzene, which material is used to prepare water-soluble detergents. Heretofore, the commercial oil-soluble sulfonic acids have contained appreciable quantities of a non-volatile diluent oil. Usually, the sulfonic acid concentration was not above about 50 percent. It is readily apparent that shipping costs are unnecessarily high on a sulfonic acid composition that contains such a high percentage of inert material.

It is believed to be apparent that it would be highly desirable to have an oil-soluble sulfonic acid which is of high concentration and at the same time suitable for preparing satisfactory products. The present invention is concerned with such a sulfonic acid and with a process of preparing this sulfonic acid.

It is an object of the present invention to provide concentrated oil-soluble sulfonic acids having improved properties.

It is another object of the present invention to provide a process for preparing concentrated oil-soluble sulfonic acids having improved properties.

It is a particular object of the present invention to provide a process for preparing an oil soluble sulfonic acid composition containing at least 82 percent, and preferably at least 90 percent, oil-soluble sulfonic acid, said composition being fluid at ambient temperatures, and having a sulfuric acid content of less than about 0.8 percent.

Broadly stated, the present invention relates to a method of preparing an oil-soluble sulfonic acid composition of high concentration, said method comprising:

(1) Treating an alkyl aromatic hydrocarbon sulfonating stock with a sulfonating agent,
(2) Allowing the reaction mass of step (1) to cool,
(3) Adding an inert, volatile hydrocarbon solvent to the reaction mass,
(4) Removing the sludge from the reaction vessel,
(5) Removing the residual sulfuric acid from the reaction mass, and
(6) Distilling the reaction mass to remove the volatile hydrocarbon solvent.

In one aspect the invention relates to an oil-soluble sulfonic acid having a concentration of at least about 82 percent by weight, and preferably at least 90 percent by weight, which is fluid at ambient temperatures and which has a sulfuric acid content of 0.8 percent or less.

Suitable hydrocarbons for use in my invention are synthetic alkyl aromatic hydrocarbons, and preferably alkyl benzene hydrocarbons, having molecular weights in the range of about 320 to about 1000. Preferably, the alkyl aromatic hydrocarbons have molecular weights in the range of about 360 to about 600.

The alkyl radicals of the alkyl aromatic hydrocarbons can be either straight or branched chain. In addition, the alkyl aromatic hydrocarbons can be monoalkyl aromatic hydrocarbons, dialkyl aromatic hydrocarbons and mixtures thereof.

Usually, the commercially available synthetic alkyl aromatic hydrocarbons are mixtures of materials having the aforementioned properties. An example of a suitable alkyl aromatic hydrocarbon is postdodecylbenzene, described briefly hereinbefore. Postdodecylbenzene consists of monoalkylbenzenes and dialkylbenzenes in the approximate mole ratio of 2:3. It has typical properties as follows:

| | |
|---|---|
| Specific gravity at 38° C. | 0.8649 |
| Average molecular weight | 385 |
| Percent sulfonatable | 88 |
| A.S.T.M. D–158 Engler: | |
|   I.B.P., ° F. | 647 |
|   5° F. | 682 |
|   50° F. | 715 |
|   90° F. | 760 |
|   95° F. | 775 |
|   F.B.P. ° F. | 779 |
| Refractive index at 23° C. | 1.4900 |
| Viscosity at: | |
|   −10° C. centipoises | 2800 |
|   20° C. do | 280 |
|   40° C. do | 78 |
|   80° C. do | 18 |
| Aniline point, ° C. | 69 |
| Pour point, ° F. | −25 |

Another suitable alkyl aromatic hydrocarbon is a material which is referred to herein as "dimer alkylate bottoms." This material is prepared by the following process, briefly stated:

(a) Dimerization of a suitable feedstock using a Friedel-Crafts alkylation sludge as a catalyst therefor, and (b) Alkylation of an aromatic hydrocarbon, preferably benzene or toluene, with the dimer alkylate of step (a) in the presence of a Friedel-Crafts catalyst.

Suitable feedstocks for use in step (a) include olefinic hydrocarbons containing from 3 to 18 carbon atoms. A preferred olefinic hydrocarbon is a material known to the petroleum industry as "cat poly gasoline" which is a mixture of predominantly branched chain olefins containing, generally, from about 5 to about 12 carbon atoms. Another preferred olefinic hydrocarbon for use as a feedstock is the dodecene fraction obtained from a catalytic polymerization unit.

The dimerization step is conducted employing from about 0.25 to about 4.0, preferably from about 0.75 to about 1.25, parts by weight of alkylation sludge per part of olefinic hydrocarbon. It is conducted at a temperature in the range of about 15° to about 75° C., preferably in the range of about 30° to about 55° C. Any residence time in excess of 5 minutes is satisfactory.

The alkylation step is conducted employing from about 0.2 to about 10.0 parts by weight of aromatic hydrocarbon per part of olefinic hydrocarbon employed in the dimerization step. Preferably, on the same basis, the amount of aromatic hydrocarbon is from about 1.0 to about 3.0 parts. The amount of Friedel-Crafts catalyst is from about 0.02 to about 0.25, preferably from about 0.08 to about 0.12, part by weight per part of olefin. The alkylation is conducted at a temperature in the range of about 5 to about 75° C., preferably in the range of about 25 to about 55° C.

On completion of the alkylation reaction, the reaction product is subjected to a wash with a caustic solution. In some cases it will be desirable to use an acid and/or water wash in addition to the caustic wash.

The caustic washed product is then subjected to a distillation. Unreacted benzene is removed overhead, arbitrary intermediate fractions are removed, and the desired alkyl aromatic hydrocarbons are removed as the bottoms. The "bottoms fraction" is referred to as dimer alkylate bottoms. The cut-point for obtaining the dimer alkylate bottoms suitably is 325° F. at 20 mm. Hg pressure. Preferably, the cut-point is 400° F. at 20 mm. Hg pressure.

The dimer alkylate bottoms for use in my invention have the following properties:

| Property | Suitable | More Suitable | Preferred |
|---|---|---|---|
| Percent Monoalkyl content* | >50 | >70 | >90 |
| Molecular weight (average) | >320 | >350 | 375–478 |
| Boiling range, ° F. at 20 mm. Hg | >325 | >375 | >400 |

*This is based on mole percent of total aromatic constituents.

These dimer alkylate bottoms are described more completely in application Ser. No. 367,417, filed May 11, 1964, now U.S. Patent No. 3,410,925, and having the same assignee as the present application. For reason of convenience, U.S. Patent No. 3,410,925 is made a part of the disclosure of the present application.

Still another suitable alkyl aromatic hydrocarbon is a material which is referred to herein as "dialkylbenzene." The term "dialkylbenzene," as used herein, refers to a hydrocarbon sulfonating stock containing a major amount of dialkylbenzenes. Usually this sulfonating stock contains at least 70 percent, and preferably at least 80 percent, dialkylbenzenes. The alkyl radicals of the dialkylbenzene contain from about 9 to about 15 carbon atoms and are attached to the phenyl group through a secondary carbon atom.

A particularly suitable method of preparing dialkylbenzenes is described in application Ser. No. 529,284, filed Feb. 23, 1966 and having the same assignee as the present application. Application Ser. No. 529,284 is a continuation-in-part of Ser. No. 446,661, filed Apr. 8, 1965, and now abandoned.

Briefly stated, application Ser. Nos. 446,661 and 529,284 teach the preparation of di-n-alkylbenzenes by disproportionation of mono-n-alkylbenzenes using a Friedel-Crafts catalyst. The mono-n-alkylbenzenes can be prepared by alkylating benzene with a chlorinated paraffin.

The preferred sulfonating agent for use in my invention is oleum. Although any of the commercially available oleums can be used, for reason of convenience I prefer to use 20 percent oleum, which contains 104.5 percent $H_2SO_4$. In addition to oleum, it is within the scope of my invention to use sulfur trioxide as the sulfonating agent. A commercially available sulfur trioxide is available from Allied Chemical Corporation under the trademark "Sulfan."

The amount of sulfonating agent can vary from about 0.50 to about 1.1 volume of sulfonating agent per volume of hydrocarbon. When using postdodecylbenzene as the hydrocarbon, a more suitable amount is from about 0.65 to about 1.1 volume of sulfonating agent per volume of hydrocarbon. Preferably, when using postdodecylbenzene, this amount is from about 0.85 to about 1.1. When using the dialkylbenzene bottoms as the hydrocarbon, the preferred amount of sulfonating agent is from about 0.75 to about 1.0 volume of sulfonating agent per volume of hydrocarbon.

It is desirable that the sulfonation reaction be conducted at a temperature in the range of about 150 to about 215° F. When the hydrocarbon employed is postdodecylbenzene, preferably the sulfonation temperature is in the range of about 175 to about 200° F. In addition, it is desirable in order to effect complete reaction that the reaction time for a batch process be at least one hour.

An inert volatile hydrocarbon solvent is employed in the process. Any inert volatile hydrocarbon having a final boiling point below about 250° F. is suitable. Examples of suitable solvents include the pentanes, hexanes, and heptanes. A particularly suitable solvent is a petroleum naphtha having a boiling range of about 115 to about 225° F. A preferred solvent is normal hexane.

A preferred means of removing the sludge from the solution containing the reaction mass is by allowing the solution to settle. The settling time is not particularly critical in this step of the invnetion. While, in general, I have found a time in the range of about 12 to about 24 hours to be suitable, it is within the scope of my invention to use a settling time of either shorter or longer duration. After allowing the admixture to settle, the sludge which is formed is withdrawn from the reaction vessel.

The material remaining in the reaction vessel comprises the sulfonic acid, unreacted hydrocarbons, volatile hydrocarbon solvent, and residual sulfuric acid. In order to remove the residual sulfuric acid, a calculated amount of lime is added to the reaction mass. The concentration of sulfuric acid present is first determined. Preferably, a stoichiometric amount of lime is then added to the reaction vessel. However, I have found, as a practical matter, that the addition of 0.90 theory of lime gives suitable results. The solution is then filtered to remove the solid calcium sulfate which is formed. A suitable means of conducting the filtration operation is through plate and frame filter presses using diatomaceous earth as a filter aid.

The solution containing the desired sulfonic acids is then distilled to remove the volatile hydrocarbon solvent. The distillation can be conducted at temperatures up to about 300° F.

It is of interest at this point that heretofore distillation of sulfonic acids was believed to be impractical due to thermal degradation. However, I have found that, if the sulfuric acid content of the solution distilled is sufficiently low, distillation can be effected without any accompanying degradation of the sulfonic acids.

In general, the sulfonic acid compositions of my invention have the following properties:

| | |
|---|---|
| Sulfonic acid, percent (wt.) | at least 82. |
| Sulfuric acid, percent (wt.) | less than 0.8. |
| Water, percent | less than 1.8. |
| Viscosity, SUS at 210° F. | 100–1500. |
| Combining weight (as sodium salt) | 440–600. |

Preferably the sulfonic acid compositions of my invention have the following properties:

| | |
|---|---|
| Sulfonic acid, percent (wt.) | at least 90. |
| Sulfuric acid, percent (wt.) | less than 0.2. |
| Water, percent | less than 0.8. |
| Viscosity, SUS at 210° F. | 400–900. |
| Combining weight (as sodium salt) | 470–550. |

The term "fluid at ambient temperature" as used herein means that the material can be poured from a container at a temperature as low as 70° F.

In order to disclose more clearly the nature of the present invention and the advantages thereof, reference will hereinafter be made to certain specific embodiments which illustrate the flexibility of the herein-described process. It should be clearly understood, however, that this is done solely by way of example and is not to be construed as a limitation upon the spirit and the scope of the appended claims.

EXAMPLE 1

This example illustrates my invention employing postdodecylbenzene as the alkyl aromatic hydrocarbon sulfonating stock.

One thousand milliliters of postdodecylbenzene was added to a 12-liter Morton flask. The postdodecylbenzene was preheated to 100° F. Eight hundred milliliters of fuming sulfuric acid (104.5% $H_2SO_4$) was added dropwise from a separatory funnel while applying vigorous agitation to the reaction mass. The sulfonation temperature was maintained at a temperature of 175° F. by a combination of heat of reaction and external heat. Upon completion of the addition of the fuming sulfuric acid, the sulfonation reaction mass was post-mixed for 1 hour and the temperature was lowered to 120° F. Hexane (3000 ml.) having an I.B.P. of 151° F. was added and the reaction mixture was post-mixed for 10 minutes. The reaction mass in hexane solvent was then transferred to a separatory funnel and allowed to settle for 12 hours. The sludge layer containing the spent acid was removed and discarded. The sulfuric and sulfonic acid contents of the sulfonic acid-hexane solution were then determined. The stoichiometric amount of lime needed for removal of the sulfuric acid present in the solution was added. (This amount was 104 grams of lime.) The mixture was stirred for 10 minutes and then filtered through a Buchner funnel which had been precoated with Dicalite filter aid. At this point the filtrate was checked for residual sulfuric acid content and to determine if any excess lime had reacted with the sulfonic acid. The filtrate was then heated to 275° F. to remove the solvent, followed by blowing with nitrogen gas for complete solvent and water removal. The finished product was then cooled and stored at less than 120° F. The product had the following analysis:

| | |
|---|---|
| Sulfonic acid, percent | 87.5 |
| Sulfuric acid, percent | 0.2 |
| Water, percent | 0.8 |
| Viscosity, SUS at 210° F. | 470.0 |
| Molecular weight (as sodium sulfonate) | 470.0 |
| Sediment, percent | 0.2 |

EXAMPLE 2

This example also used postdodecylbenzene as the sulfonating stock. The procedure employed was the same as that of Example 1, with the exception that the oleum to postdodecylbenzene ratio on a volume basis was 1:1, and the sulfonation temperature was 185° F.

The charge in this example was:

| | Ml. |
|---|---|
| Postdodecylbenzene | 1000 |
| Oleum | 1000 |
| Naphtha | 3000 |

Upon completion of the sulfonation reaction and withdrawal of the sludge there remained 3550 grams of acid-naphtha solution having a residual sulfuric acid content of 4.5 percent. The stoichiometric amount (130 grams) of lime was added to remove the sulfuric acid. After distillation at 275° F., stripping with nitrogen gas and cooling, the resulting product has the following analysis:

| | |
|---|---|
| Sulfonic acid, percent | 92.0 |
| Sulfuric acid, percent | 0.1 |
| Water, percent | 0.5 |
| Viscosity, SUS at 210° F. | 560.0 |
| Molecular weight (as sodium sulfonate) | 472.0 |
| Sediment, percent | 0.03 |

It is apparent that changing the oleum to sulfonating stock ratio and changing the sulfonating temperature resulted in an increase in the amount of sulfonic acid produced.

EXAMPLE 3

This example illustrates the effect of a high sulfonation temperature. Post dodecylbenzene was the charge stock. The sulfonation temperature employed was 200° F. Otherwise, the procedure was the same as Examples 1 and 2.

The charge was:

| | Ml. |
|---|---|
| Postdodecylbenzene | 1000 |
| Oleum | 1000 |
| Naphtha | 3000 |

Upon completion of the sulfonation reaction and withdrawal of the sludge there remained 3310 grams of naphtha-sulfonic acid solution. One hundred twenty seven grams of lime was added to remove the sulfuric acid. Upon distilling the hexane-sulfonic acid solution, nitrogen glowing and cooling, there resulted a product having the following analysis:

| | |
|---|---|
| Sulfonic acid, percent | 79.0 |
| Sulfuric acid, percent | 0.5 |
| Water, percent | 0.5 |
| Viscosity, SUS at 210° F. | 490.0 |
| Molecular weight (as sodium sulfonate) | 430.0 |
| Sediment, percent | 0.05 |

It is apparent that the higher sulfonation temperature of this example resulted in a lower sulfonic acid content and a lower molecular weight of the sodium sulfonate.

EXAMPLE 4

This example illustrates my invention employing dimer alkylate bottoms as the alkyl aromatic hydrocarbon sulfonating stock. A 0.90 volume/volume ml. oleum to hydrocarbon ratio was employed. The sulfonation temperature was 180° F. Otherwise, the procedure was the same as that of Example 1.

The charge was as follows:

| | Ml. |
|---|---|
| Dimer alkylate bottoms | 1300 |
| Naphtha | 3800 |
| Oleum | 1180 |

Upon completion of the sulfonation reaction and withdrawal of the sludge, there remained 4435 grams of naphtha-acid solution having a 3.2 percent sulfuric acid content. This solution was contacted with 132 grams of lime and filtered. The filtrate was subjected to distillation, nitrogen blowing and cooling as previously. The resulting product had the following analysis:

| | |
|---|---|
| Sulfonic acid, percent | 83.6 |
| Sulfuric acid, percent | 0.4 |
| Water, percent | 0.4 |
| Bottoms sediment and water, percent | Trace |
| Molecular weight (as sodium sulfonate) | 496.0 |
| Viscosity, SUS at 210° F. | 786.0 |

The table below illustrates the improved fluidity of a 90 percent sulfonic acid product of my invention as compared to a 62 percent sodium sulfonate prepared by a conventional process. Data are given for products prepared for postdodecylbenzene and from dimer alkylate bottoms.

| Sulfonating stock and product: | Viscosity SUS at 210° F. |
|---|---|
| Postdodecylbenzene: | |
| 90% sulfonic acid | 520 |
| 62% sodium sulfonate | 1140 |
| Dimer alkylate bottoms: | |
| 90% sulfonic acid | 760 |
| 62% sodium sulfonate | 2671 |

While particular embodiments of the invention have been described, it will be understood, of course, that the invention is not limited thereto, since many modifications may be made; and it is therefore contemplated to cover by the appended claims any such modifications as fall within the true spirit and scope of the invention.

The invention having thus been described, what is claimed and desired to be secured by Letters Patent is:

1. A method of preparing an oil-soluble sulfonic acid composition containing at least about 82 percent by weight oil-soluble sulfonic acid, said method comprising:
   (1)
   (a) treating a mono- or di-alkyl benzene hydrocarbon sulfonating stock, having a molecular weight of from about 320 to about 1000, with a sulfonating agent selected from the group consisting of oleum and sulfur trioxide, wherein the sulfonating agent to sulfonating stock ratio is in the range of from about 0.50 to about 1.1 on a volume basis and from the sulfonation reaction is conducted at a temperature in the range of from about 150 to about 215° F.,
   (b) allowing the reaction mass of step (a) to cool,
   (c) adding an inert volatile hydrocarbon solvent having a boiling point below about 250° F. to the reaction mass;
   (2) removing the sludge from the admixture;
   (3) removing residual sulfuric acid from the hydrocarbon solution containing sulfonic acids by treating the solution with lime in an amount equal to at least 0.90 of the stoichiometric requirement based on the sulfuric acid present in the solution; and
   (4) distilling the reaction mass to remove the volatile materials present and thereby producing the oil-soluble sulfonic acid composition.

2. A method of preparing an oil-soluble sulfonic acid composition containing at least 82 percent by weight oil-soluble sulfonic acids, said method comprising:
   (1) treating a mono- or di-alkyl benzene hydrocarbon sulfonating stock, having a molecular weight in the range of from about 360 to about 600, with oleum, wherein the oleum to sulfonating stock ratio is in the range of about 0.50 to about 1.1 volume of oleum per volume of sulfonating stock, and wherein the sulfonation reaction is conducted at a temperature in the range of about 150 to about 215° F.;
   (2) allowing the reaction mass of step (1) to cool;
   (3) adding an inert, volatile hydrocarbon solvent, having a boiling point below about 250° F., to the reaction mass;
   (4) allowing the admixture of step (3) to settle;
   (5) withdrawing the sludge from the reaction vessel;
   (6) adding an amount of lime, which is at least 0.90 times the stoichiometric equivalent of the sulfuric acid present in the reaction mass, to the reaction vessel to form calcium sulfate;
   (7) removing the calcium sulfate formed in step (6) from the reaction vessel; and
   (8) distilling the reaction mass at a temperature up to about 300° F. to remove the volatile materials present.

3. The method of claim 2 wherein the synthetic alkyl benzene hydrocarbon sulfonating stock is postdodecylbenzene.

4. The method of claim 2 wherein the synthetic alkyl benzene hydrocarbon sulfonating stock is dimer alkylate bottoms.

5. The method of claim 2 wherein the synthetic alkyl benzene hydrocarbon sulfonating stock contains at least 70 percent by weight dialkylbenzene.

6. The method of preparing an oil-soluble sulfonic acid composition containing at least 90 percent by weight oil-soluble sulfonic acids, said method comprising:
   (1) treating postdodecylbenzene with 20 percent oleum, wherein the oleum to postdodecylbenzene ratio is in the range of about 0.85 to about 1.1 volume of oleum per volume postdodecylbenzene and wherein the sulfonation reaction is conducted at a temperature in the range of about 175 to about 200° F.;
   (2) allowing the reaction mass of step (1) to cool;
   (3) adding an inert volatile hydrocarbon solvent, selected from the group consisting of hexane and petroleum naphtha having a boiling range of about 115 to about 225° F., to the reaction mass;
   (4) allowing the admixture of step (3) to settle;
   (5) withdrawing the sludge from the reaction vessel;
   (6) adding an amount of lime, which is a stoichiometric equivalent of the sulfuric acid present in the reaction mass, to the reaction vessel to form calcium sulfate;
   (7) removing the calcium sulfate formed in step (6) from the reaction vessel; and
   (8) distilling the reaction mass to a temperature up to about 300° F. to remove the volatile materials present and thereby produce the desired oil-soluble sulfonic acid composition.

7. The method of claim 6 wherein the hydrocarbon solvent of step (3) is hexane.

References Cited
UNITED STATES PATENTS

| | | | |
|---|---|---|---|
| 2,353,700 | 7/1944 | De Groote et al. | 260—504 |
| 2,809,209 | 10/1957 | Voorheis | 260—504 |
| 2,810,745 | 10/1957 | Wolski | 260—504 |
| 2,882,301 | 4/1959 | Sias et al. | 260—505.5 |
| 3,017,430 | 1/1962 | Arnold et al. | 260—504 |
| 3,154,576 | 10/1964 | Fainman | 260—504 |

FOREIGN PATENTS

| | | |
|---|---|---|
| 864,289 | 3/1961 | Great Britain. |

BERNARD HELFIN, Primary Examiner

L. DE CRESCENTE, Assistant Examiner